2,900,159

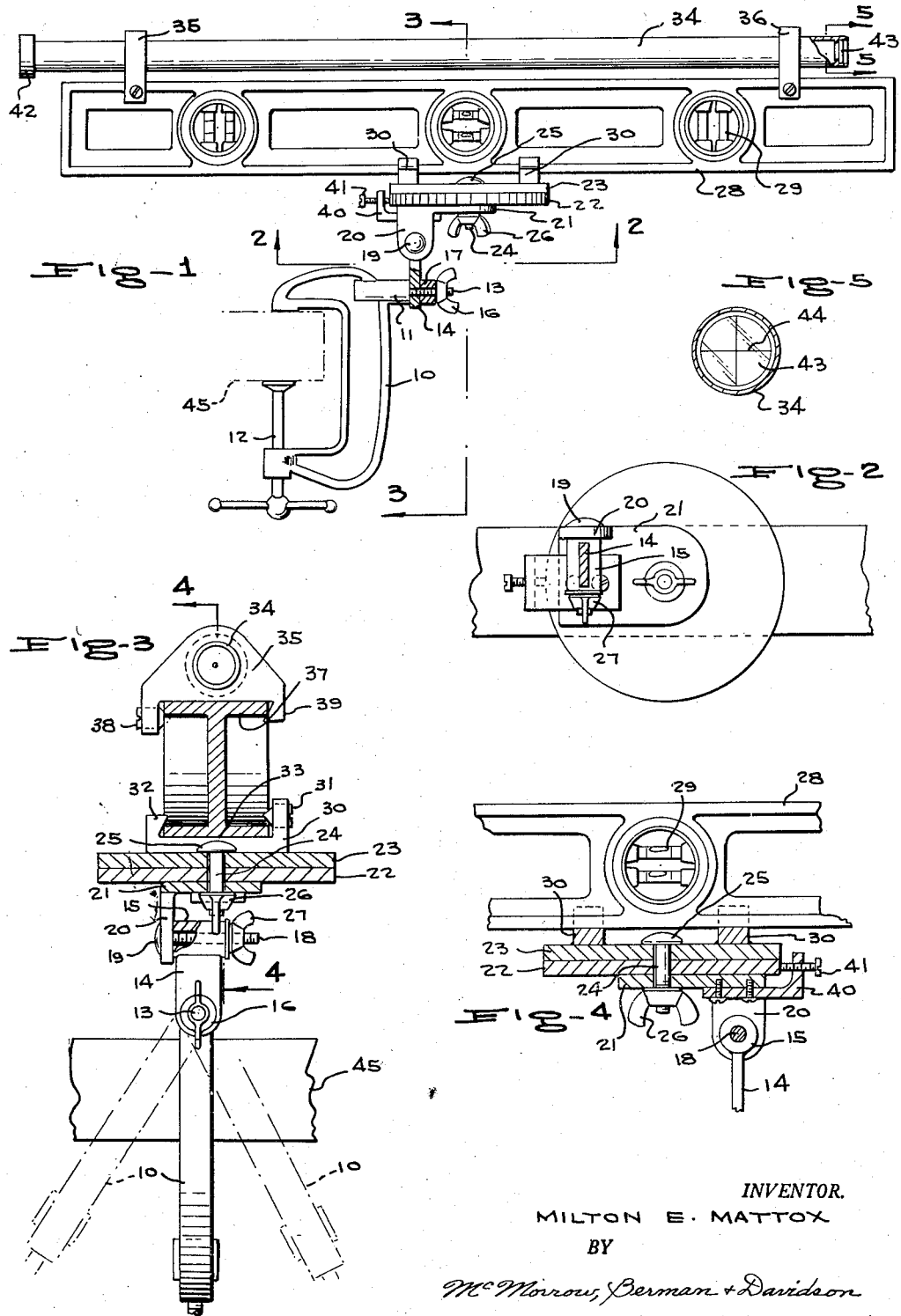

SIGHTING LEVEL

Milton E. Mattox, Dunellen, N.J.

Application August 31, 1956, Serial No. 607,354

3 Claims. (Cl. 248—229)

The present invention relates to mechanics' levels generally, and in particular to a level assembly having a sighting tube and means for supporting the level.

An object of the present invention is to provide a support assembly for a level having a sighting tube which lends itself to ready portability and rapid assembly and installation upon common support means, such as beams, fences, carpenter's saw horses, vehicle frame members, and the like, one which may be quickly attached and detached from the spirit level, and one which may be economically manufactured and assembled.

Another object of the present invention is to provide a support assembly for a spirit level having a sighting tube carried thereon which is sturdy in construction, one which permits swaying of the sighting tube in a full circle, and provides for measurement of the distance of swinging movement of the sighting tube, one which lends itself to efficient use by builders, carpenters, highway engineers, and mechanics generally, and one which is highly effective in action.

These and other objects and advantages of the present invention will be fully apparent from the following description when taken in connection with the annexed drawing, in which:

Figure 1 is an elevational view of the spirit level and sighting tube and the support assembly of the present invention, shown attached to the end of a beam, the beam being shown in dotted lines, Figure 2 is a sectional view taken on the line 2—2 of Figure 1, Figure 3 is a sectional view, on an enlarged scale, taken on the line 3—3 of Figure 1, Figure 4 is a sectional view taken on the line 4—4 of Figure 3, and Figure 5 is a sectional view, on an enlarged scale, taken on the line 5—5 of Figure 1.

Referring in greater detail to the drawing in which like numerals indicate like parts throughout the several views, the present invention consists in a support assembly for a spirit level having a sighting tube carried on its upper face, the support assembly comprising a C-clamp 10 having an arm 11 projecting perpendicularly from its end remote from the clamping screw 12. The arm 11 is formed integrally with or may be secured by welding to the web and rim of the clamp 10 and has an attaching element or stud bolt 13 projecting from its end remote from the clamp 10.

A flat plate member 14 having a cylindrical formation 15 on its upper end is provided with an aperture receiving the stud bolt 13. A wing nut 16 is employed to tighten a collar 17 against the plate 14 to secure the plate 14 in any adjusted position relative to the arm 11.

The bore through the cylindrical formation 15 on the upper end of the plate 14 receives a securing element or bolt 18 having its head 19 exteriorly of a downwardly depending lug 20 which is formed integrally with a bracket 21.

The bracket 21 has its upper face disposed horizontally and upon the upper face rests a circular plate 22 having a centrally disposed hole therethrough and having around its periphery a series of degree markings constituting measuring indicia.

Another circular plate 23 is arranged in superimposed abutting relation with respect to the plate 22 and is similarly provided with a centrally disposed aperture for receiving a bolt 24 having a head 25. The bolt 24 is positioned so that its head rests upon the upper face of the plate 23 and extends through the apertures in the plates 22 and 23 and an aperture provided in the upper surface of the bracket 21 and has a securing means or wing nut 26 on its lower end portion which engages the bracket 21 to adjustably secure the plate 23 in any selected position of movement relative to the plate 22. Another securing means or wing nut 27 and the bolt 18 are used to tighten the engagement of the lug 20 with the cylindrical formation 15, thereby permitting the adjustment of the bracket 21 relative to the arm 11 and the plate member 14.

A spirit level 28 having bubble assemblies 29 is positioned above the upper face of the plate 23 and is fixedly secured to the plate 23 by means of a pair of clamps 30, each having a pointed set screw 31 which, together with the undercut shoulder 32 wedgingly engages the frame 33 of the level 28. A sighting tube 34 is spaced above the level 28 and is longitudinal therewith. Other clamps 35 and 36 support the sighting tube 34 upon the upper flange 37 and have similarly arranged set screws 38 and shoulders 39 as have the clamps 30.

The periphery of the second plate 23 is provided with matching degree markings constituting measuring indicia.

Means is provided for rocking the plate 22 relative to the bracket 21 and comprises an L-shaped bracket 40 having its short leg vertically disposed and provided with a tapped hole through which extends a locking screw 41, the inner end of the locking screw 41 being adapted to abut against the periphery of the plate 22 to secure the latter in any adjusted position.

The sighting tube 34 is provided with an eye piece 42 at one end and has a lens system therein including a lens 43 having engraved thereon stadia lines or crosshair 44 which construction is conventional and the use of which is well known in the art.

The use of the sighting level of the present invention is as follows. The clamp 10 is first secured to a projecting beam or other support member, indicated by the reference numeral 45, and the wing nut 16 is loosened so that the plate member 14 may be adjusted to a nearly vertical position. The wing nut 16 is then tightened and the wing nut 27 loosened so that the bracket 21 may be positioned with its upper face horizontal. This puts the plate 22 in a horizontal position and it is adjusted for direction, if desired, by loosening and again tightening the set screw 41. These adjustments are made, of course, according to the bubble indications in the bubble assemblies 29 so that the end result is that the sighting tube 34 is in a horizontal position and may be swung through a complete circle by loosening the wing nut 26. Level measurements may then be made by sighting through the sighting tube 34 and placing such suitable markers, as is desired, on trees, buildings, or the like.

What is claimed is:

1. For use with a horizontally disposed frame including a spirit level, a support assembly for said frame, said support assembly comprising an upstanding clamp, an arm projecting perpendicularly from said clamp intermediate the ends thereof, an attaching element carried by said arm, a plate member secured to said attaching element, a bracket having an upper surface disposed horizontally positioned above and adjacent said plate member and secured to said plate member, a horizontally disposed first plate resting on the upper surface of said bracket, a second plate arranged in superimposed abutting relation with respect to said first plate, means embodying a vertically disposed bolt passing through said first and second plates and said bracket connecting said second plate to said first plate for rotary movement relative to the first plate, securing means on said bolt and engageable with said bracket for securing said second plate in any selected position of movement relative to said first plate, and clamp means carried by said second plate detachably engageable with said frame.

2. For use with a horizontally disposed frame including a spirit level, a support assembly for said frame, said support assembly comprising an upstanding clamp, an arm projecting perpendicularly from said clamp intermediate the ends thereof, an attaching element carried by said arm, a plate member secured to said attaching element, a bracket having an upper surface disposed horizontally positioned above and adjacent said plate member, a lug dependingly carried by said bracket, means adjustably securing said lug to said plate member, a horizontally disposed first plate resting on the upper surface of said bracket, a second plate arranged in superimposed abutting relation with respect to said first plate, means embodying a vertically disposed bolt passing through said first and second plates and said bracket connecting said second plate to said first plate for rotary movement relative to the first plate, securing means on said bolt and engageable with said bracket for securing said second plate in any selected position of movement relative to said first plate, and clamp means carried by said second plate detachably engageable with said frame.

3. For use with a horizontally disposed frame including a spirit level, a support assembly for said frame, said support assembly comprising an upstanding clamp, an arm projecting perpendicularly from said clamp intermediate the ends thereof, an attaching element carried by said arm, a plate member secured to said attaching element, a bracket having an upper surface disposed horizontally positioned above and adjacent said plate member, a lug dependingly carried by said bracket, a securing element carried by said plate member and extending through said lug, another securing means on said securing element for adjustably securing said lug to said plate member, a horizontally disposed first plate resting on the upper surface of said bracket, a second plate arranged in superimposed abutting relation with respect to said first plate, means embodying a vertically disposed bolt passing through said first and second plates and said bracket connecting said second plate to said first plate for rotary movement relative to the first plate, securing means on said bolt and engageable with said bracket for securing said second plate in any selected position of movement relative to said first plate, and clamp means carried by said second plate detachably engageable with said frame.

References Cited in the file of this patent

UNITED STATES PATENTS

| | | |
|---|---|---|
| 470,802 | Hannes | Mar. 15, 1892 |
| 824,479 | Halvorsen | June 26, 1906 |
| 1,276,220 | Howell | Aug. 20, 1918 |
| 2,432,058 | Wiken et al. | Dec. 2, 1947 |
| 2,540,584 | Jaycox | Feb. 6, 1951 |
| 2,720,372 | Gowan | Oct. 11, 1955 |
| 2,762,128 | Whelan | Sept. 11, 1956 |

FOREIGN PATENTS

| | | |
|---|---|---|
| 128,549 | Sweden | June 20, 1950 |